United States Patent Office 3,351,553
Patented Nov. 7, 1967

3,351,553
RADIATION RESISTANT FLUIDS
Ralph Hollinghurst, Thundersley, Essex, England, assignor, by mesne assignments, to Mobil Oil Corporation, a corporation of New York
No Drawing. Filed July 9, 1963, Ser. No. 293,893
5 Claims. (Cl. 252—45)

The present invention relates to fluids suitable for a variety of purposes and having the property of resistance to the effects of nuclear radiation and being also thermally stable. The invention more particularly relates to fluids suitable for use in applications where petroleum oil products would normally be used but for their susceptibility to the effects of radiation.

Radiation resistant fluids are known containing, for instance, fused aromatic ring compounds or alkyl derivatives of such compounds. Such fluids are used for example as coolants and moderators for nuclear reactors, and in lubricating oil, possibly accompanied by inhibitors, such as aromatic selenides. Polyphenyls show a good thermal stability and resistance to degradation by exposure to radiation but they have a melting point which limits their usefulness in lower temperature regions, and they have a relatively low boiling point. Known polyphenyls are thus not satisfactory at temperatures such as 100° F.

It is an object of the present invention to provide a radiation resistant fluid and it is also an object of the invention to provide such a fluid which is thermally stable. It is a further object of the invention to provide a radiation resistant fluid satisfactory for use at temperatures lower than hitherto applied. Further objects include the provision of such fluids as coolants and/or moderators in nuclear reactors, lubricants, hydraulic fluids and heat transfer media generally, for use in circumstances involving exposure to nuclear radiation.

The invention is based on the observation that partially hydrogenated terphenyls which are fluids at ambient temperature offer a satisfactory radiation resistance in applications such as those mentioned above and also have a sufficiently high boiling point.

According to the invention a radiation resistant fluid composition comprises at least one partially hydrogenated polyphenyl or mixture thereof. The polyphenyl is preferably a terphenyl.

The invention also includes within its scope hydraulic fluids, heat transfer media, moderators and lubricants consisting of or containing a partially hydrogenated polyphenyl, such as a partially hydrogenated terphenyl. The invention further embraces apparatus exposed to nuclear radiation and containing a fluid comprising at least one partially hydrogenated polyphenyl, such as a partially hydrogenated terphenyl.

Partially hydrogenated terphenyl mixtures particularly suitable for inclusion in fluids according to the present invention are those obtained by the partial hydrogenation of a by-product hydrocarbon fraction formed in the manufacture of biphenyl by the pyrolysis of benzene.

These partially hydrogenated terphenyls or mixed partially hydrogenated terphenyls and the manner of preparation thereof are fully disclosed in U.S. Patent No. 2,364,719, wherein they are referred to as partially hydrogenated hydrocarbon liquid mixtures. A typical material, employed in the various examples and tests presented herein, has the following physical characteristics:

Composition _____ Partially hydrogenated terphenyls.
Appearance _____ Colorless, oily liquid.
Viscosity, SUS
   At 100° F. _____ 124–164.
   At 210° F. _____ 38–40.
Pour Point, ° C. _____ −26 to −28.
Distillation Range
   First Drop _____° C__ 340–349.
   10% _____° C__ 345–358.
   50% _____° C__ 353–360.
   90% _____° C__ 362–389.
   95% _____° C__ 371–396.

This particular material is marketed by Monsanto Chemical Company of St. Louis, Missouri, under the Tradename "HB–40." See Monsanto Technical Bulletin No. PL–40, June 1961.

According to a further feature of the invention, a fluid for use according to the invention may also contain a proportion of a polyphenyl, such as diphenyl, or a solid polyphenyl or alkyl derivative thereof. A preferred radiation resistant fluid may comprise, for instance, a mixture of (a) a partially hydrogenated terphenyl with (b) from about 1% to about 30%, by weight, of diphenyl. It is also contemplated, according to the invention, to incorporate along with the partially hydrogenated terphenyl from about 1% to about 30%, by weight, of a polystyrene or an alkyl derivative thereof, such polystyrene or alkylated polystyrene having a molecular weight of about 5,000 to about 100,000 and preferably from about 10,000 to about 50,000.

Fluids according to the invention may also contain free radical inhibitors, such as alkyl or aryl selenides, or aryl disulfides, such as diphenyl disulfide and dibenzyl disulfide, in amounts of from about 1% to about 10%, by weight of the total composition. The fluids of the invention may be blended with petroleum oils, kerosine and the like. Thus, hydraulic fluids, bearing lubricants, gear lubricants and the like may be formulated according to physical characteristics required for use where radiation makes a normal petroleum oil unsuitable. The fluids have an excellent resistance to thermal degradation and may be employed in the formulation of aircraft gas turbine lubricants and heat transfer media expected to undergo severe conditions, including coolants and moderators for nuclear reactants. The lubricating compositions according to the invention may be made by incorporating the radiation resistant fluids in mineral oil, especially in mineral lubricating oil, for use under conditions of radiation exposure and to provide for an increased range of viscosity. In general, the radiation resistant fluids are added to the petroleum oil in amounts of from about 5% to about 75%, by weight, the usual amount being from about 20% to about 50%. Illustrative examples of the compositions formulated according to the present invention are shown in Table I, which presents experimental data indicating the change in viscosity under a given dose of gamma radiation.

Table II gives corresponding data for an oil stabilized with various organic sulfide compounds and shows the advantage of the disulfides over the mono-sulfides or cyclic sulfur compounds. It is seen that the organic disulfides greatly increase the radiation resistance of the partially hydrogenated terphenyls and of the oil and kerosine compositions containing the partially hydrogenated terphenyls. However, it will be noted that the degree of effectiveness of the aromatic sulfide depends on the composition in which it is used. Thus, diphenyl disulfide does not reduce viscosity increase in an aromatic ring system (compare Fluids 1 and 20, Table I); but is very effective when parafinic material is added (see Fluid 22, Table I, and Oil J, Table II), whereas dibenzyl disulfide is effective in both types of material, but to a lesser extent than diphenyl disulfide in a predominantly paraffinic system. Metal deactivators may be added to the fluids containing the disulfides and selenides should it be desired to reduce their activity towards metals, such as copper.

The percentages indicated for the components of the various compositions in Tables I and II are by weight, based on the total composition.

Tables III and IV show the advantageous wear and oxidation stability of several typical compositions of the invention.

Table V shows the excellent thermal stability of some of the compositions listed in Table I in comparison with a typical aromatic heat transfer oil.

Although the invention has been described herein by means of specific examples and illustrative embodiments thereof, the invention is not to be limited in any way thereby but only as indicated in the appended claims.

TABLE IV.—CATALYTIC OXIDATION TEST

[260° F., 40 hours, 10 liters of air per hour, 25 ml. of fluid with Cu, Fe Al and Pb catalysts]

| | N.V.[1] Increase, mq. KOH/q. | Pb Loss, mq. | Percent Visc. Increase at 210° F. | Sludge |
|---|---|---|---|---|
| Fluid 5 | 0.05 | Nil | 3 | Nil |
| Fluid 5 after irradiation to 5×10⁸ rads | 0.05 | 7 | 16 | Nil |
| Fluid 7 | 0.05 | 8 | 4 | Trace |
| Oil 13+3% Dibenzyl disulfide (for comparison with Fluid 7) | 0.05 | 7 | 3 | Heavy |

[1] Neutralization value.

TABLE I

| | | 5×10⁸ | | 10⁹ | |
|---|---|---|---|---|---|
| Fluid | γ-Dosage (rads) (in the presence of small amounts of air at 20° C.) | Percent Viscosity Increase— | | Percent Viscosity Increase— | |
| | | At 100° F. | At 210° F. | at 100° F. | at 210° F. |
| 1 | Mixed partially hydrogenated terphenyls | 33 | 11 | 70 | 25 |
| 2 | 10% Diphenyl in Fluid 1 | 30 | 9.5 | 58 | 21 |
| 3 | 20% Diphenyl in Fluid 1 | [1]19 | 8.6 | 45 | 20 |
| 4 | 20% o-Terphyenyl in Fluid 1 | 24 | 10 | 65 | [1]27 |
| 5 | 3% Didodecyl selenide in Fluid 1 | 23 | | 42 | 19 |
| 6 | 3% Didodecyl selenide in Fluid 3 | 15 | 9 | 28 | 12 |
| 7 | 3% Dibenzyl disulfide in Fluid 1 | 26 | [1]11 | 54 | [1]24 |
| 8 | 20% Polystyrene (22,000 M.W.) in Fluid 1 (Viscosity at 100° F. of 1,200 cs. 90 V.I.) | 40 | 13 | 84 | 24 |
| 9 | 10% Polystyrene (22,000 M.W.) in Fluid 1 (Viscosity at 100° F. of 250 cs. 83 V.I.) | 5 | −5 | 29 | 2.2 |
| 10 | 20% Polystyrene (35,000 M.W.) in Fluid 1 (Viscosity at 100° F. of 3,200 cs. 100 V.I.) | −15 | −21 | 18 | −11 |
| 11 | 10% Polystyrene (35,000 M.W.) in Fluid 1 (Viscosity at 100° F. of 370 cs. 97 V.I.) | −11 | −17 | 3.8 | −15 |
| 12 | 30% Poly-alpha-methylstyrene (boiling range 150–300° C. at 5 mm. Hg) in Fluid 1 (Viscosity at 100° F. of 105 cs.) | 26 | 8.9 | 85 | 34 |
| 13 | High V.I. paraffinic light neutral turbine stock 32 cs. at 100° F. | 106 | 64 | 400 | 194 |
| 14 | 20% Fluid 1 in Oil 13 | [1]76 | 41 | 266 | 130 |
| 15 | 50% Fluid 1 in Oil 13 | 52 | 30 | 152 | 76 |
| 16 | 20% Fluid 1+3% Didodecyl selenide in Oil 13 | 50 | 29 | 157 | 85 |
| 17 | 50% Fluid 1+3% Didodecyl selenide in Oil 13 | 38 | 21 | 97 | 52 |
| 18 | Low sulfur kerosine (1.4 cs. at 100° F.) | 55 | | 205 | |
| 19 | 40% Fluid 1+10% Diphenyl in kerosine 18 | 30 | | 100 | |
| 20 | Fluid 1+3% Diphenyl disulfide (for comparison with 7) | 35.3 | 13.0 | 72 | 27 |
| 21 | Fluid 1+3% Diphenyl mono-sulfide (for comparison with 7) | | | 60 | 27 |
| 22 | Fluid 15+3% Diphenyl disulfide | 45.6 | 22.3 | 93.0 | 41.2 |

[1] Approximate.

TABLE II

| | γ-Dosage (rads) (in presence of small amounts of air at 20° C.) | 5×10⁸ | | 10⁹ | |
|---|---|---|---|---|---|
| | | Percent Viscosity Increase at 100° F. | Percent Viscosity Increase at 210° F. | Percent Viscosity Increase at 100° F. | Percent Viscosity Increase at 210° F. |
| J | Oil 13 (for comparison) | [1]106 | 64 | 400 | 194 |
| K | 13+3% Diphenyl disulfide | 62 | 38 | 137 | 78 |
| L | 13+3% Diphenyl mono-sulfide | 83 | 51 | 257 | 142 |
| M | 13+10% Thionaphthene | [1]100 | 55 | 288 | 141 |
| | 13+3% Dibenzyl disulfide | 59 | 36 | 221 | 107 |

[1] Approximate.

TABLE III.—WEAR TEST

[Shell 4-ball machine; wear scar diameter (cm.) after 10 minutes]

| | Scar Diameter | |
|---|---|---|
| Fluid | At 45 kg. Load | At 100 kg. Load |
| 1 | 0.22 | 0.33 |
| 6 | 0.16 | 0.27 |
| 7 | 0.07 | 0.16 |
| 9 | | 0.34 |
| 11 | | 0.32 |
| 13 (for comparison) | 0.23 | |

TABLE V.—THERMAL STABILITY

[In stainless steel bombs under nitrogen at 650° F.]

| Fluid | Average Gas Evolution Rate, ml. gas/gm. Fluid/Day (at N.T.P.) from 70–240 Hours | Percent Viscosity Change at 210° F. cs. After 240 Hours |
|---|---|---|
| 1 | 0.036 | −5.2 |
| 7 | 0.050 | −3.6 |
| 9 | 0.075 | −68.9 |
| Aromatic Heat Transfer Oil (initial boiling point 600° F.) for Comparison | 2.9 | |

What is claimed is:
1. A radiation resistant composition comprising a liquid petroleum hydrocarbon and from about 5% to about 75%, by weight, of a partially hydrogenated terphenyl.
2. The composition of claim 1 wherein the hydrocarbon is a mineral lubricating oil.
3. A composition according to claim 1 wherein the hydrocarbon is kerosene.
4. A method of lubricating the metal surfaces of equipment wherein the lubricating oil is exposed to radiation comprising the step of applying to the said metal surfaces a lubricant consisting essentially of from about 25% to about 95% by weight of a mineral oil normally prone to radiation deterioration and from about 75% to about 5% by weight of a partially hydrogenated terphenyl.
5. The method of claim 4 wherein there is additionally present a minor amount of didodecyl selenide.

References Cited

UNITED STATES PATENTS

| 2,081,886 | 5/1937 | Story et al. | 252—45 |
| 2,364,719 | 12/1944 | Jenkins | 260—666 |
| 2,967,827 | 1/1961 | Bolt et al. | 252—45 |
| 2,982,730 | 5/1961 | Barry | 252—59 |
| 3,077,452 | 2/1963 | Fainman | 252—59 |

FOREIGN PATENTS

| 809,360 | 2/1959 | Great Britain. |
| 894,009 | 4/1962 | Great Britain. |
| 913,411 | 12/1962 | Great Britain. |
| 914,772 | 2/1963 | Great Britain. |

DANIEL E. WYMAN, *Primary Examiner.*

L. G. XIARHOS, *Assistant Examiner.*